(12) United States Patent
Budko et al.

(10) Patent No.: US 12,499,201 B2
(45) Date of Patent: Dec. 16, 2025

(54) AUTHENTICATION AND PERSONAL DATA SHARING FOR PARTNER SERVICES USING OUT-OF-BAND OPTICAL MARK RECOGNITION

(71) Applicant: Winkk, Inc., Menlo Park, CA (US)

(72) Inventors: Renata Budko, Los Altos, CA (US); Dmitry Feld, Santa Clara, CA (US); Konstantin Kalinin, Rostov-on-Don (RU); Mikhail Petrushan, Rostov-on-Don (RU)

(73) Assignee: Winkk, Inc., Menlo Park, CA (US)

( * ) Notice: Subject to any disclaimer, the term of this patent is extended or adjusted under 35 U.S.C. 154(b) by 0 days.

(21) Appl. No.: 18/139,568

(22) Filed: Apr. 26, 2023

(65) Prior Publication Data
US 2023/0267454 A1    Aug. 24, 2023

Related U.S. Application Data

(63) Continuation of application No. 17/314,900, filed on May 7, 2021, now Pat. No. 11,640,602, which is a
(Continued)

(51) Int. Cl.
*G06Q 20/38* (2012.01)
*G06F 21/36* (2013.01)
(Continued)

(52) U.S. Cl.
CPC .......... *G06F 21/36* (2013.01); *G06K 7/1417* (2013.01); *G06Q 20/12* (2013.01);
(Continued)

(58) Field of Classification Search
CPC .......... G06Q 20/3815; G06Q 20/3274; G06Q 20/3276; G06Q 20/3823; G06Q 20/385;
(Continued)

(56) References Cited

U.S. PATENT DOCUMENTS 5,581,615 A    12/1996 Stern
5,850,444 A    12/1998 Rune
(Continued)

FOREIGN PATENT DOCUMENTS

CN    107169374 B    9/2017
CN    107918790 A    4/2018
(Continued)

OTHER PUBLICATIONS

Tao et al., "Simple Matrix—A Multivariate Public Key Cryptosystem (MPKC) for Encryption" from Finite Field and Their Applications vol. 35, Sep. 2015, pp. 352-368 (Year 2015).
(Continued)

*Primary Examiner* — John W Hayes
*Assistant Examiner* — Wodajo Getachew
(74) *Attorney, Agent, or Firm* — Haverstock & Owens, A Law Corporation (57) ABSTRACT

Disclosed are methods and apparatuses for creating a verified mutually authenticated transaction between a service provider and an on-line identity for a physical client person. A dynamic optical mark may be displayed on a device screen where the physical client person is using a web service. The dynamic optical mark may be recognized via scanning the dynamic optical mark by a personal mobile device equipped with a camera. The verified mutually authenticated transaction between the service provider and the on-line identity for the physical client person may be used for sharing personal data of the physical client person by using out-of-band optical mark recognition of the dynamic optical mark. The verified mutually authenticated transaction may be initiated with a time-limited one-time password comprising a sequence of numbers encoded in the dynamic optical mark.

6 Claims, 2 Drawing Sheets

Related U.S. Application Data continuation of application No. 15/721,899, filed on Sep. 30, 2017, now Pat. No. 11,030,618.

(60) Provisional application No. 62/402,728, filed on Sep. 30, 2016.

(51) Int. Cl.

| | | |
|---|---|---|
| *G06K 7/14* | (2006.01) | |
| *G06Q 20/12* | (2012.01) | |
| *G06Q 20/32* | (2012.01) | |
| *G06Q 20/40* | (2012.01) | |
| *H04L 9/40* | (2022.01) | |
| *H04W 12/06* | (2021.01) | |
| *G06Q 20/42* | (2012.01) | |

(52) U.S. Cl.
CPC ....... *G06Q 20/3276* (2013.01); *G06Q 20/388* (2013.01); *G06Q 20/4014* (2013.01); *H04L 63/0838* (2013.01); *H04W 12/06* (2013.01); *G06Q 20/3263* (2020.05); *G06Q 20/3265* (2020.05); *G06Q 20/38215* (2013.01); *G06Q 20/3823* (2013.01); *G06Q 20/3825* (2013.01); *G06Q 20/3829* (2013.01); *G06Q 20/385* (2013.01); *G06Q 20/40145* (2013.01); *G06Q 20/425* (2013.01)

(58) Field of Classification Search
CPC ......... G06Q 20/38215; G06Q 20/4014; G06Q 20/388; H04L 63/0838; G06K 7/1417
USPC .......................................................... 705/67
See application file for complete search history.

(56) References Cited

U.S. PATENT DOCUMENTS

| | | |
|---|---|---|
| 5,966,444 A | 10/1999 | Yuan |
| 5,987,130 A | 11/1999 | Chang |
| 6,446,207 B1 | 9/2002 | Vanstone |
| 6,820,204 B1 | 11/2004 | Desai |
| 6,895,506 B1 | 5/2005 | Abu-Husein |
| 6,947,943 B2 | 9/2005 | DeAnna |
| 7,100,051 B1 | 8/2006 | Kipnis |
| 7,167,565 B2 | 1/2007 | Rajasekaran |
| 7,178,033 B1 | 2/2007 | Garcia |
| 7,185,816 B1 * | 3/2007 | Shoobridge ...... G06K 19/06037 235/462.04 |
| 7,468,927 B1 | 12/2008 | Battista |
| 7,562,028 B1 | 7/2009 | Donner |
| 7,571,320 B2 | 8/2009 | Davis |
| D607,009 S | 12/2009 | McEnaney |
| 7,683,773 B1 | 3/2010 | Goodall |
| D614,192 S | 4/2010 | Takani |
| 7,885,635 B2 | 2/2011 | Laursen |
| 7,925,013 B1 | 4/2011 | Washington |
| 7,992,102 B1 | 8/2011 | De Angelo |
| 7,992,190 B2 | 8/2011 | Mevissen |
| 8,139,581 B1 | 3/2012 | Mraz |
| 8,161,463 B2 | 4/2012 | Johnson |
| 8,218,762 B2 | 7/2012 | Itoh |
| 8,363,259 B2 | 1/2013 | Gillboa |
| 8,417,642 B2 | 4/2013 | Oren |
| 8,417,643 B2 | 4/2013 | Mardikar |
| 8,543,834 B1 | 9/2013 | Barra |
| 8,543,884 B2 | 9/2013 | Mansour |
| 8,550,351 B2 * | 10/2013 | Sun .......................... G06K 7/14 235/462.1 |
| 8,621,209 B1 | 12/2013 | Johansson |
| 8,639,785 B2 | 1/2014 | Kiley |
| 8,892,871 B2 | 11/2014 | Cho |
| D719,176 S | 12/2014 | Cohen |
| D719,177 S | 12/2014 | Cohen |
| D723,050 S | 2/2015 | Minsung et al. |
| 8,959,579 B2 | 2/2015 | Barton |
| 9,112,835 B2 | 8/2015 | Izozaki |
| 9,210,156 B1 | 12/2015 | Little |
| 9,219,732 B2 | 12/2015 | Baghdassaryan |
| 9,225,695 B1 | 12/2015 | Riera |
| 9,350,539 B2 | 5/2016 | Veugen |
| 9,392,460 B1 | 7/2016 | Blake |
| 9,419,951 B1 | 8/2016 | Felsher et al. |
| D765,669 S | 9/2016 | Shaw |
| 9,485,237 B1 | 11/2016 | Johansson |
| 9,552,543 B2 * | 1/2017 | Toedtli ................. G06K 7/1456 |
| 9,577,992 B2 | 2/2017 | Zizi |
| 9,615,066 B1 | 4/2017 | Tran |
| 9,665,169 B1 | 5/2017 | Dai |
| 9,706,406 B1 | 7/2017 | Adams |
| 9,721,080 B2 | 8/2017 | Moran |
| D800,764 S | 10/2017 | Thoreson |
| 9,825,757 B2 | 11/2017 | Cao |
| 9,854,218 B2 | 12/2017 | Mardikar |
| D813,884 S | 3/2018 | Penker |
| 9,959,694 B2 | 5/2018 | Lindsay |
| 9,961,547 B1 | 5/2018 | Molina-Markham |
| 9,973,481 B1 | 5/2018 | Desai |
| 10,019,561 B1 | 7/2018 | Shelton |
| 10,033,703 B1 | 7/2018 | Sharifi Mehr |
| 10,200,364 B1 | 2/2019 | Ketharaju |
| 10,257,229 B1 | 4/2019 | Kuo |
| 10,277,400 B1 | 4/2019 | Griffin |
| D847,857 S | 5/2019 | Elatta |
| 10,322,728 B1 | 6/2019 | Porikli |
| 10,374,800 B1 | 8/2019 | Sharfi |
| 10,380,333 B1 | 8/2019 | Moran |
| 10,402,800 B2 | 9/2019 | Lucas |
| 10,404,458 B1 | 9/2019 | Yamada |
| 10,430,789 B1 | 10/2019 | Herald, Jr. |
| 10,432,605 B1 | 10/2019 | Lester |
| 10,437,975 B1 | 10/2019 | Shelton |
| 10,452,897 B1 | 10/2019 | Benkreira |
| 10,453,562 B2 | 10/2019 | Moloney-Egnatios |
| 10,467,401 B2 | 11/2019 | Kolagi |
| 10,521,223 B1 | 12/2019 | Bogushefsky, III |
| 10,530,577 B1 | 1/2020 | Pazhoor |
| 10,559,307 B1 | 2/2020 | Khalegi |
| 10,630,467 B1 | 4/2020 | Gilbert |
| 10,674,446 B1 | 6/2020 | Trent |
| 10,713,965 B2 | 7/2020 | Cosyn |
| 10,762,406 B2 | 9/2020 | Cash |
| 10,769,633 B2 | 9/2020 | Dua |
| 10,789,441 B2 * | 9/2020 | Tu ..................... G06K 19/06037 |
| 10,810,290 B2 | 10/2020 | Minter et al. |
| 10,824,702 B1 | 11/2020 | Shahidzadeh |
| 10,824,703 B1 | 11/2020 | Desai |
| 10,867,021 B1 | 12/2020 | Shelton |
| 10,887,307 B1 | 1/2021 | Newstadt |
| 10,911,425 B1 | 2/2021 | Hitchcock |
| 10,922,631 B1 | 2/2021 | Shahidzadeh |
| 10,936,744 B1 | 3/2021 | Trepetin |
| 10,958,424 B1 | 3/2021 | Chhabra |
| D916,890 S | 4/2021 | Nagpal |
| 10,970,607 B2 | 4/2021 | Guangtao |
| 11,005,839 B1 | 5/2021 | Shahidzadeh |
| 11,030,618 B1 | 6/2021 | Budko |
| 11,038,694 B1 | 6/2021 | Kleinman |
| D925,602 S | 7/2021 | Xu |
| 11,056,242 B1 | 7/2021 | Jain |
| D928,803 S | 8/2021 | Faller |
| D928,820 S | 8/2021 | Bodduluri |
| 11,101,993 B1 | 8/2021 | Shahidzadeh |
| 11,121,878 B2 | 9/2021 | McCarty |
| D942,469 S | 2/2022 | Abdullah et al. |
| 11,256,791 B2 | 2/2022 | Douglas |
| 11,281,553 B1 | 3/2022 | Jain |
| 11,283,835 B1 | 3/2022 | Gordon |
| 11,305,110 B2 | 4/2022 | Toong |
| 11,328,042 B2 | 5/2022 | Keith, Jr. |
| 11,342,051 B1 | 5/2022 | Jain |
| 11,510,172 B1 | 11/2022 | Feng |
| 11,553,337 B2 | 1/2023 | Keith, Jr. |
| 11,563,582 B2 | 1/2023 | Keith, Jr. |

(56) References Cited

U.S. PATENT DOCUMENTS

| | | |
|---|---|---|
| 11,574,045 B2 | 2/2023 | Keith, Jr. |
| 11,587,650 B2 | 2/2023 | Power |
| 11,588,794 B2 | 2/2023 | Keith, Jr. |
| 11,610,012 B1 | 3/2023 | Della Maggiora |
| 11,637,694 B2 | 4/2023 | Slamov |
| 11,640,602 B2 | 5/2023 | Rudko |
| 11,652,815 B2 | 5/2023 | Keith, Jr. |
| 11,657,140 B2 | 5/2023 | Keith, Jr. |
| 11,766,213 B1 | 9/2023 | Kahn |
| 11,778,049 B1 | 10/2023 | Zamir |
| 11,954,194 B1 | 4/2024 | Wu |
| 12,182,254 B2 | 12/2024 | Pohjola |
| 2002/0099955 A1 | 7/2002 | Peled et al. |
| 2002/0114454 A1 | 8/2002 | Hamilton |
| 2002/0131592 A1 | 9/2002 | Hinnant |
| 2002/0169871 A1 | 11/2002 | Cravo de Almeida |
| 2002/0186688 A1 | 12/2002 | Inoue |
| 2003/0014750 A1 | 1/2003 | Kamen |
| 2003/0016844 A1 | 1/2003 | Numaoka |
| 2003/0021416 A1 | 1/2003 | Brown |
| 2003/0147267 A1 | 8/2003 | Huttunen |
| 2003/0174067 A1 | 9/2003 | Soliman |
| 2003/0221030 A1 | 11/2003 | Pontius |
| 2004/0151309 A1 | 8/2004 | Gentry |
| 2004/0162984 A1 | 8/2004 | Freeman |
| 2004/0198392 A1 | 10/2004 | Harvey |
| 2004/0223616 A1 | 11/2004 | Kocarev |
| 2005/0084114 A1 | 4/2005 | Jung |
| 2005/0135609 A1 | 6/2005 | Lee |
| 2005/0147240 A1 | 7/2005 | Agrawal |
| 2005/0210260 A1 | 9/2005 | Venkatesan |
| 2006/0031301 A1 | 2/2006 | Herz et al. |
| 2006/0075060 A1 | 4/2006 | Clark |
| 2006/0196950 A1 | 9/2006 | Killcote |
| 2006/0210067 A1 | 9/2006 | Vedula |
| 2006/0212931 A1 | 9/2006 | Shull |
| 2006/0236408 A1 | 10/2006 | Yan |
| 2006/0282681 A1 | 12/2006 | Scheidt |
| 2006/0285544 A1 | 12/2006 | Taylor |
| 2007/0086653 A1 | 4/2007 | Javidi |
| 2007/0094509 A1 | 4/2007 | Wei |
| 2007/0185718 A1 | 8/2007 | DiMambro |
| 2007/0250904 A1 | 10/2007 | Waller |
| 2008/0022141 A1 | 1/2008 | Hammarlund |
| 2008/0031460 A1 | 2/2008 | Brookner |
| 2008/0045218 A1 | 2/2008 | Okochi |
| 2008/0080748 A1 | 4/2008 | Sukegawa |
| 2008/0084836 A1 | 4/2008 | Baird |
| 2008/0165937 A1 | 7/2008 | Moore |
| 2008/0243014 A1 | 10/2008 | Moussavi |
| 2008/0301057 A1 | 12/2008 | Oren |
| 2009/0006796 A1 | 1/2009 | Chang |
| 2009/0023422 A1 | 1/2009 | MacInnis |
| 2009/0090577 A1 | 4/2009 | Takahashi |
| 2009/0161873 A1 | 6/2009 | Simard |
| 2009/0194592 A1* | 8/2009 | Ming .............. G06K 19/06037 235/494 |
| 2009/0271321 A1 | 10/2009 | Stafford |
| 2009/0279693 A1 | 11/2009 | Billet |
| 2009/0315671 A1* | 12/2009 | Gocho ............. H04N 21/42204 340/5.8 |
| 2009/0327746 A1 | 12/2009 | Greco |
| 2010/0079591 A1 | 4/2010 | Lee |
| 2010/0100716 A1 | 4/2010 | Scott et al. |
| 2010/0122274 A1 | 5/2010 | Gillies |
| 2010/0329232 A1 | 12/2010 | Tubb |
| 2011/0072142 A1 | 3/2011 | Herz et al. |
| 2011/0106935 A1 | 5/2011 | Srinivasan |
| 2011/0135096 A1 | 6/2011 | Rane |
| 2011/0167255 A1 | 7/2011 | Matzkel |
| 2011/0167273 A1 | 7/2011 | Maas |
| 2011/0187642 A1 | 8/2011 | Faith |
| 2011/0194694 A1 | 8/2011 | Struik |
| 2011/0231673 A1 | 9/2011 | Alekseev |
| 2011/0233284 A1 | 9/2011 | Howard |
| 2011/0271103 A1 | 11/2011 | Shur |
| 2011/0276952 A1 | 11/2011 | Tyloch |
| 2011/0284644 A1* | 11/2011 | Walmsley ............ G06K 7/1456 235/494 |
| 2011/0302405 A1 | 12/2011 | Marlow |
| 2011/0321052 A1 | 12/2011 | Long |
| 2012/0028710 A1 | 2/2012 | Furukawa |
| 2012/0047563 A1 | 2/2012 | Wheeler |
| 2012/0054847 A1 | 3/2012 | Schultz |
| 2012/0067943 A1 | 3/2012 | Saunders |
| 2012/0098750 A1 | 4/2012 | Allen |
| 2012/0127157 A1 | 5/2012 | Adler |
| 2012/0185910 A1 | 7/2012 | Miettinen |
| 2012/0214442 A1 | 8/2012 | Crawford |
| 2012/0221859 A1 | 8/2012 | Marien |
| 2012/0272058 A1 | 10/2012 | Wang et al. |
| 2012/0281885 A1 | 11/2012 | Syrdal |
| 2012/0284602 A1 | 11/2012 | Seed |
| 2012/0330845 A1 | 12/2012 | Kang |
| 2013/0086625 A1 | 4/2013 | Driscoll |
| 2013/0111208 A1* | 5/2013 | Sabin ...................... G06F 21/36 713/176 |
| 2013/0170363 A1 | 7/2013 | Millington |
| 2013/0177151 A1 | 7/2013 | Sella |
| 2013/0185779 A1 | 7/2013 | Tamai |
| 2013/0202104 A1 | 8/2013 | Ghouti |
| 2013/0205410 A1 | 8/2013 | Sambamurthy |
| 2013/0227700 A1 | 8/2013 | Dhillon |
| 2013/0232543 A1 | 9/2013 | Cheng |
| 2013/0239191 A1 | 9/2013 | Bostick |
| 2013/0243187 A1 | 9/2013 | Hortsmeyer |
| 2013/0304676 A1 | 11/2013 | Gupta |
| 2013/0305324 A1 | 11/2013 | Alford, Jr. |
| 2013/0326224 A1 | 12/2013 | Yavuz |
| 2013/0346023 A1 | 12/2013 | Novo |
| 2014/0002481 A1 | 1/2014 | Broughton |
| 2014/0007048 A1 | 1/2014 | Qureshi |
| 2014/0013422 A1 | 1/2014 | Janus |
| 2014/0038583 A1 | 2/2014 | Berg |
| 2014/0039892 A1 | 2/2014 | Mills |
| 2014/0040628 A1* | 2/2014 | Fort ........................ H04L 63/18 713/182 |
| 2014/0053261 A1 | 2/2014 | Gupta |
| 2014/0064166 A1 | 3/2014 | HomChadhuri |
| 2014/0098723 A1 | 4/2014 | Battista |
| 2014/0108803 A1 | 4/2014 | Probert |
| 2014/0175179 A1* | 6/2014 | Carter ................. G06Q 20/3224 235/494 |
| 2014/0201531 A1 | 7/2014 | Toy |
| 2014/0207724 A1 | 7/2014 | Ledenev |
| 2014/0215222 A1 | 7/2014 | Sakumoto |
| 2014/0244009 A1 | 8/2014 | Mestas |
| 2014/0244514 A1 | 8/2014 | Rodriguez |
| 2014/0244515 A1 | 8/2014 | Garfinkle |
| 2014/0250496 A1 | 9/2014 | Amidon |
| 2014/0266696 A1 | 9/2014 | Addison |
| 2014/0278077 A1 | 9/2014 | Levin |
| 2014/0304371 A1 | 10/2014 | Mraz |
| 2014/0333161 A1 | 11/2014 | Kim |
| 2014/0344455 A1 | 11/2014 | Cheng |
| 2014/0351618 A1 | 11/2014 | Connell |
| 2014/0368601 A1 | 12/2014 | deCharms |
| 2015/0086088 A1 | 3/2015 | King |
| 2015/0088674 A1* | 3/2015 | Flurscheim .......... G06Q 20/326 705/17 |
| 2015/0089568 A1 | 3/2015 | Sprague |
| 2015/0095352 A1 | 4/2015 | Lacey |
| 2015/0095580 A1 | 4/2015 | Liu |
| 2015/0095648 A1 | 4/2015 | Nix |
| 2015/0095986 A1 | 4/2015 | Karpey |
| 2015/0103136 A1 | 4/2015 | Anderson |
| 2015/0112606 A1 | 4/2015 | He |
| 2015/0113279 A1 | 4/2015 | Andersen |
| 2015/0121524 A1 | 4/2015 | Fawaz |
| 2015/0134963 A1 | 5/2015 | Izu |
| 2015/0142666 A1 | 5/2015 | Landrok |
| 2015/0223731 A1 | 8/2015 | Sahin |
| 2015/0242601 A1 | 8/2015 | Griffiths |
| 2015/0242605 A1 | 8/2015 | Du |

(56) References Cited

U.S. PATENT DOCUMENTS

| | | |
|---|---|---|
| 2015/0258892 A1 | 9/2015 | Wu |
| 2015/0262067 A1 | 9/2015 | Sridhara |
| 2015/0264569 A1 | 9/2015 | Toyota |
| 2015/0269389 A1 | 9/2015 | Lee |
| 2015/0271679 A1 | 9/2015 | Park |
| 2015/0278805 A1 | 10/2015 | Spencer, III |
| 2015/0280911 A1 | 10/2015 | Andoni |
| 2015/0294092 A1 | 10/2015 | Balasubramanian |
| 2015/0294784 A1 | 10/2015 | Higashiyama |
| 2015/0302398 A1* | 10/2015 | Desai ............... G06Q 20/322 705/41 |
| 2015/0310444 A1 | 10/2015 | Chen |
| 2015/0312041 A1 | 10/2015 | Choi |
| 2015/0339838 A1* | 11/2015 | Friedman ............ G06K 7/1495 345/641 |
| 2015/0347734 A1 | 12/2015 | Beigi |
| 2015/0350201 A1 | 12/2015 | Cornell |
| 2015/0356289 A1 | 12/2015 | Brown |
| 2015/0356462 A1 | 12/2015 | Fawaz |
| 2015/0365229 A1 | 12/2015 | Patey |
| 2015/0365235 A1 | 12/2015 | Hostyn |
| 2015/0370826 A1 | 12/2015 | Mraz |
| 2015/0370993 A1 | 12/2015 | Moturu |
| 2015/0373007 A1 | 12/2015 | Sheller |
| 2015/0379238 A1 | 12/2015 | Connor |
| 2016/0005038 A1* | 1/2016 | Kamal ............... G06Q 20/3223 705/44 |
| 2016/0007288 A1 | 1/2016 | Samardzija |
| 2016/0011224 A1 | 1/2016 | Pollack |
| 2016/0022193 A1 | 1/2016 | Rau |
| 2016/0055327 A1 | 2/2016 | Moran |
| 2016/0057623 A1 | 2/2016 | Dutt |
| 2016/0063492 A1 | 3/2016 | Kobres |
| 2016/0063874 A1 | 3/2016 | Czerwinski |
| 2016/0065558 A1 | 3/2016 | Suresh |
| 2016/0065570 A1 | 3/2016 | Spencer |
| 2016/0098334 A1 | 4/2016 | Harihharakrishnan |
| 2016/0103984 A1 | 4/2016 | Warrier |
| 2016/0103996 A1 | 4/2016 | Salajegheh |
| 2016/0110528 A1 | 4/2016 | Gupta |
| 2016/0117673 A1 | 4/2016 | Landrock |
| 2016/0125920 A1 | 5/2016 | Kim |
| 2016/0135107 A1 | 5/2016 | Hampel |
| 2016/0140320 A1 | 5/2016 | Moturu |
| 2016/0148222 A1 | 5/2016 | Davar |
| 2016/0151603 A1 | 6/2016 | Shouldice |
| 2016/0155013 A1* | 6/2016 | Kobori ............... G06T 11/60 382/190 |
| 2016/0155037 A1* | 6/2016 | Kobori ............... G06K 19/0614 235/494 |
| 2016/0180078 A1 | 6/2016 | Chhabra |
| 2016/0182503 A1 | 6/2016 | Cheng |
| 2016/0183795 A1 | 6/2016 | Cowley |
| 2016/0191499 A1 | 6/2016 | Momchillov |
| 2016/0212115 A1 | 7/2016 | Hamlin |
| 2016/0220151 A1 | 8/2016 | Zizi |
| 2016/0227411 A1 | 8/2016 | Lundblade |
| 2016/0232726 A1 | 8/2016 | Zizi |
| 2016/0239649 A1 | 8/2016 | Zhao |
| 2016/0239657 A1* | 8/2016 | Loughlin-Mchugh ............ G06F 21/45 |
| 2016/0253498 A1 | 9/2016 | Valencia |
| 2016/0283406 A1 | 9/2016 | Linga et al. |
| 2016/0300049 A1 | 10/2016 | Guedalia |
| 2016/0320831 A1 | 11/2016 | McCubbin |
| 2016/0342873 A1 | 11/2016 | Winkk et al. |
| 2016/0352696 A1 | 12/2016 | Essigmann |
| 2016/0357944 A1 | 12/2016 | Iyer |
| 2017/0000422 A1 | 1/2017 | Moturu |
| 2017/0005995 A1 | 1/2017 | Yang |
| 2017/0013453 A1 | 1/2017 | Lee |
| 2017/0024660 A1 | 1/2017 | Chen |
| 2017/0041145 A1 | 2/2017 | Sinchak |
| 2017/0041309 A1* | 2/2017 | Ekambaram ........ H04L 63/1483 |
| 2017/0048062 A1 | 2/2017 | Polak |
| 2017/0055878 A1 | 3/2017 | Chon |
| 2017/0063528 A1 | 3/2017 | Seo |
| 2017/0068994 A1 | 3/2017 | Slomkowski |
| 2017/0070340 A1 | 3/2017 | Hibshoosh |
| 2017/0070890 A1 | 3/2017 | Luff |
| 2017/0085382 A1 | 3/2017 | Kamakari |
| 2017/0104590 A1 | 4/2017 | Wang |
| 2017/0116402 A1 | 4/2017 | Hirabayashi |
| 2017/0124385 A1 | 5/2017 | Ganong |
| 2017/0134372 A1* | 5/2017 | Dube ............... H04L 63/0846 |
| 2017/0147345 A1 | 5/2017 | Clevenger |
| 2017/0154366 A1 | 6/2017 | Turgeman |
| 2017/0174180 A1 | 6/2017 | Hoyos |
| 2017/0188938 A1 | 7/2017 | Toh |
| 2017/0193211 A1 | 7/2017 | Blake |
| 2017/0214529 A1 | 7/2017 | Oliveira |
| 2017/0220407 A1 | 8/2017 | Estrada |
| 2017/0230172 A1 | 8/2017 | Andersson |
| 2017/0230344 A1 | 8/2017 | Dhar |
| 2017/0264597 A1 | 9/2017 | Pizot |
| 2017/0272419 A1 | 9/2017 | Kumar |
| 2017/0287490 A1 | 10/2017 | Biswal |
| 2017/0289168 A1 | 10/2017 | Bar |
| 2017/0295010 A1 | 10/2017 | Shibutani |
| 2017/0310479 A1 | 10/2017 | Sato |
| 2017/0311250 A1 | 10/2017 | Rico Alvarino |
| 2017/0317823 A1 | 11/2017 | Gandhi |
| 2017/0337364 A1 | 11/2017 | Whaley |
| 2017/0339118 A1 | 11/2017 | Hwang |
| 2017/0366514 A1 | 12/2017 | Malka |
| 2018/0000367 A1 | 1/2018 | Longinotti-Buitoni |
| 2018/0005239 A1 | 1/2018 | Schlesinger |
| 2018/0005465 A1* | 1/2018 | Truong ............... G07C 9/00857 |
| 2018/0007530 A1 | 1/2018 | Tanaka |
| 2018/0012003 A1 | 1/2018 | Asulin |
| 2018/0013571 A1 | 1/2018 | Aarnio |
| 2018/0025125 A1 | 1/2018 | Crane |
| 2018/0025135 A1 | 1/2018 | Odom |
| 2018/0027411 A1 | 1/2018 | Taneja |
| 2018/0029560 A1 | 2/2018 | Mohaupt |
| 2018/0039990 A1 | 2/2018 | Lindermann |
| 2018/0046803 A1 | 2/2018 | Li |
| 2018/0063784 A1 | 3/2018 | Abraham |
| 2018/0089408 A1 | 3/2018 | Cheung |
| 2018/0101688 A1 | 4/2018 | Zage |
| 2018/0109696 A1 | 4/2018 | Thanigasalam |
| 2018/0114221 A1* | 4/2018 | Karantzis ........... G06Q 20/4014 |
| 2018/0135815 A1 | 5/2018 | Rowles |
| 2018/0144615 A1 | 5/2018 | Kinney |
| 2018/0150622 A1 | 5/2018 | Zaitsev |
| 2018/0165432 A1 | 6/2018 | Cierna |
| 2018/0167816 A1 | 6/2018 | Kusens et al. |
| 2018/0176015 A1 | 6/2018 | Wang |
| 2018/0189160 A1 | 7/2018 | Yasin |
| 2018/0189161 A1 | 7/2018 | Yasin |
| 2018/0212770 A1 | 7/2018 | Costa |
| 2018/0248865 A1 | 8/2018 | Johansson |
| 2018/0285580 A1 | 10/2018 | Chen |
| 2018/0285879 A1 | 10/2018 | Gadnis |
| 2018/0302416 A1 | 10/2018 | Einberg |
| 2018/0322266 A1 | 11/2018 | Kwok |
| 2018/0329857 A1 | 11/2018 | Ko |
| 2018/0350455 A1 | 12/2018 | Rosen |
| 2018/0359112 A1 | 12/2018 | Lee |
| 2018/0375848 A1 | 12/2018 | Tunnell |
| 2019/0000350 A1 | 1/2019 | Narayan |
| 2019/0021001 A1 | 1/2019 | Park |
| 2019/0095320 A1 | 3/2019 | Biswas |
| 2019/0103957 A1 | 4/2019 | Isobe |
| 2019/0116051 A1 | 4/2019 | Rome |
| 2019/0121989 A1 | 4/2019 | Mousseau |
| 2019/0122024 A1 | 4/2019 | Schwartz |
| 2019/0133537 A1 | 5/2019 | Ghose |
| 2019/0149333 A1 | 5/2019 | Harnik |
| 2019/0188111 A1 | 6/2019 | Ozog |
| 2019/0199759 A1 | 6/2019 | Anderson |
| 2019/0207918 A1 | 7/2019 | Kurian |
| 2019/0220583 A1 | 7/2019 | Douglas |

(56) References Cited

U.S. PATENT DOCUMENTS

| | | |
|---|---|---|
| 2019/0230170 A1 | 7/2019 | Marlin |
| 2019/0236465 A1 | 8/2019 | Vleugels |
| 2019/0243956 A1 | 8/2019 | Sheets |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0278895 A1 | 9/2019 | Streit |
| 2019/0279204 A1 | 9/2019 | Norton |
| 2019/0280868 A1 | 9/2019 | Streit |
| 2019/0281025 A1 | 9/2019 | Harriman |
| 2019/0281036 A1 | 9/2019 | Eisen |
| 2019/0287427 A1 | 9/2019 | Schepers |
| 2019/0289017 A1 | 9/2019 | Agarwal |
| 2019/0303944 A1 | 10/2019 | Borucki |
| 2019/0304575 A1 | 10/2019 | Beltre |
| 2019/0318122 A1 | 10/2019 | Hockey |
| 2019/0334708 A1 | 10/2019 | Carpor |
| 2019/0336046 A1 | 11/2019 | Shuster |
| 2019/0342092 A1 | 11/2019 | Handschuh |
| 2019/0347888 A1 | 11/2019 | Agbeyo |
| 2019/0354660 A1 | 11/2019 | Fong |
| 2019/0354787 A1 | 11/2019 | Fong |
| 2019/0356745 A1 | 11/2019 | Rosedale |
| 2019/0370445 A1 | 12/2019 | Fong |
| 2019/0386814 A1 | 12/2019 | Ahmed |
| 2019/0387098 A1 | 12/2019 | McEnroe |
| 2019/0391895 A1 | 12/2019 | Della Corte |
| 2020/0014541 A1 | 1/2020 | Streit |
| 2020/0029214 A1 | 1/2020 | Aylward |
| 2020/0042723 A1 | 2/2020 | Krishnamoorthy |
| 2020/0044852 A1 | 2/2020 | Streit |
| 2020/0050745 A1 | 2/2020 | Kim |
| 2020/0050931 A1 | 2/2020 | Bharti |
| 2020/0053096 A1 | 2/2020 | Bendersky |
| 2020/0066071 A1 | 2/2020 | Budman |
| 2020/0074333 A1 | 3/2020 | Bandyopadhyay |
| 2020/0092111 A1 | 3/2020 | Anshel |
| 2020/0097643 A1 | 3/2020 | Uzun |
| 2020/0099675 A1 | 3/2020 | Mardiks Rappaport |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127821 A1 | 4/2020 | Dolev |
| 2020/0127974 A1 | 4/2020 | Morlando |
| 2020/0133373 A1 | 4/2020 | Huang |
| 2020/0134145 A1 | 4/2020 | Bapst |
| 2020/0151430 A1 | 5/2020 | Hassan |
| 2020/0152206 A1 | 5/2020 | Shen |
| 2020/0156654 A1 | 5/2020 | Boss |
| 2020/0162435 A1 | 5/2020 | Kubo |
| 2020/0175157 A1 | 6/2020 | Wilding |
| 2020/0193051 A1 | 6/2020 | Van Antwerp |
| 2020/0242417 A1 | 7/2020 | Sagi |
| 2020/0267709 A1 | 8/2020 | Feng |
| 2020/0302310 A1 | 9/2020 | Woiceshyn |
| 2020/0320282 A1 | 10/2020 | Boic |
| 2020/0322321 A1 | 10/2020 | Lynn |
| 2020/0349245 A1 | 11/2020 | Shila |
| 2020/0358611 A1 | 11/2020 | Hoang |
| 2020/0358787 A1 | 11/2020 | Barker |
| 2020/0366671 A1 | 11/2020 | Larson |
| 2020/0383633 A1 | 12/2020 | Su |
| 2020/0387696 A1 | 12/2020 | Kushwah |
| 2020/0403787 A1 | 12/2020 | Islam |
| 2020/0403992 A1 | 12/2020 | Huffman |
| 2021/0005224 A1 | 1/2021 | Rothschild |
| 2021/0014314 A1 | 1/2021 | Yamada |
| 2021/0026985 A1 | 1/2021 | Rind |
| 2021/0036851 A1 | 2/2021 | Villapakkam |
| 2021/0037000 A1 | 2/2021 | Attard |
| 2021/0049032 A1 | 2/2021 | White |
| 2021/0051015 A1 | 2/2021 | Widmann |
| 2021/0051177 A1 | 2/2021 | White |
| 2021/0096826 A1 | 4/2021 | Duggal |
| 2021/0123835 A1 | 4/2021 | Glennon |
| 2021/0126935 A1 | 4/2021 | Todd |
| 2021/0152417 A1 | 5/2021 | Baird |
| 2021/0152554 A1 | 5/2021 | Taft |
| 2021/0157291 A1 | 5/2021 | Uchizawa |
| 2021/0167946 A1 | 6/2021 | Bitan |
| 2021/0173906 A1 | 6/2021 | Keith, Jr. |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |
| 2021/0173949 A1 | 6/2021 | Keith, Jr. |
| 2021/0174333 A1 | 6/2021 | Keith, Jr. |
| 2021/0176064 A1 | 6/2021 | Keith, Jr. |
| 2021/0176066 A1 | 6/2021 | Keith, Jr. |
| 2021/0176218 A1 | 6/2021 | Keith, Jr. |
| 2021/0176223 A1 | 6/2021 | Falk |
| 2021/0176235 A1 | 6/2021 | Keith, Jr. |
| 2021/0176633 A1 | 6/2021 | Keith, Jr. |
| 2021/0183512 A1 | 6/2021 | Van Dusen |
| 2021/0194608 A1 | 6/2021 | Yao |
| 2021/0200852 A1 | 7/2021 | Gupta |
| 2021/0248928 A1 | 8/2021 | Akiyama |
| 2021/0250759 A1 | 8/2021 | Ziv |
| 2021/0281421 A1 | 9/2021 | Semenovskiy |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0303664 A1 | 9/2021 | Gonser |
| 2021/0350918 A1 | 11/2021 | Paul |
| 2021/0362750 A1 | 11/2021 | Yang |
| 2021/0390537 A1 | 12/2021 | Budko et al. |
| 2022/0027439 A1 | 1/2022 | Greenberger |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036356 A1 | 2/2022 | Praszczalek |
| 2022/0036905 A1 | 2/2022 | Keith, Jr. |
| 2022/0038895 A1 | 2/2022 | Keith, Jr. |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0045865 A1 | 2/2022 | Mukherjee |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. et al. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. et al. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0165393 A1 | 5/2022 | Inz |
| 2022/0197985 A1 | 6/2022 | Keith, Jr. |
| 2022/0200971 A1 | 6/2022 | Vigneswaran |
| 2022/0223292 A1 | 7/2022 | Devitt |
| 2022/0229888 A1 | 7/2022 | Keith, Jr. |
| 2022/0253513 A1 | 8/2022 | Aras |
| 2022/0286966 A1 | 9/2022 | Zhao |
| 2022/0309407 A1 | 9/2022 | Ramirez |
| 2022/0337425 A1 | 10/2022 | Kim |
| 2022/0382844 A1 | 12/2022 | Keith, Jr. |
| 2022/0385458 A1 | 12/2022 | Keith, Jr. |
| 2022/0385645 A1 | 12/2022 | Murdoch |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. et al. |
| 2023/0117628 A1 | 4/2023 | Giffard |
| 2023/0143854 A1 | 5/2023 | Venezia |
| 2023/0185896 A1 | 6/2023 | Keith, Jr. |

(56) References Cited

U.S. PATENT DOCUMENTS

| | | |
|---|---|---|
| 2023/0187062 A1 | 6/2023 | Weijsen |
| 2023/0198766 A1 | 6/2023 | Keith, Jr. et al. |
| 2023/0198962 A1 | 6/2023 | Keith, Jr. |
| 2023/0254120 A1 | 8/2023 | Islamov |
| 2023/0254121 A1 | 8/2023 | Slamov |
| 2023/0254122 A1 | 8/2023 | Islamov |
| 2023/0267454 A1 | 8/2023 | Budko |
| 2023/0283602 A1 | 9/2023 | Keith, Jr. et al. |
| 2023/0289431 A1 | 9/2023 | Keith, Jr. |
| 2023/0291573 A1 | 9/2023 | Cheon |

FOREIGN PATENT DOCUMENTS

| | | | | |
|---|---|---|---|---|
| CN | 107924475 | A | 4/2018 | |
| CN | 106413128 | B | 7/2020 | |
| EP | 3276561 | A | 1/2018 | |
| EP | 3457344 | A1 | 3/2019 | |
| IN | 106413128 | B | 7/2020 | |
| TW | 200404294 | A | 3/2004 | |
| WO | WO-2009060004 | A1 * | 5/2009 | ........... B65G 19/287 |
| WO | WO-2009066004 | A1 * | 5/2009 | .............. F27B 19/04 |
| WO | 2014188336 | A1 | 11/2014 | |
| WO | 2016179433 | A1 | 11/2016 | |
| WO | 2020065132 | A1 | 4/2020 | |
| WO | 2020092542 | A1 | 5/2020 | |
| WO | 2021119187 | A1 | 7/2021 | |
| WO | 2022172040 | A1 | 8/2022 | |

OTHER PUBLICATIONS

Erdem Alkim et al., "Post-Quantum key exchange—a new hope", International Association for Cryptologic Research, vol. 20161116:063839, Nov. 16, 2016, pp. 1-22.

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

International Search Report and Written Report for the International Application No. PCT/US2020/064099 dated Mar. 16, 2021.

Bywater Films, "Winkk: Emotion to Action." Vimeo, published Oct. 7, 2015 (Retrieved from the Internet Mar. 22, 2021). Internet URL: <https://vimeo.com/141695923> (Year: 2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

Magoon, Owais, "iOS app." Behance published Sep. 7, 2015 (Retrieved from the Internet Mar. 22, 2021). Internet URL: <https://www.behance.net/gallery/27383661/iOS-app> (Year: 2015).

Jeffrey, B.A., Hannan, M.T., Quinn, E.K., Zimmerman, S., Barton, B.A. , Rubin, C.T., &Kiel, D. P. (2012). Self-reported adherence with the use of a device in a clinical trial . . . electronic monitors: The VIBES study. BMC Medical Research Methodology, 12 n/a-171.doi:http://dx.doi.org (Year: 2012).

Maxrizal, M., "Public Key Cryptosystem Based on Singular Matrix", 2022, Trends in Sciences. Nakhon Si Thammara, Thailand, 19 (3) p. 2147.

* cited by examiner

Fig. 1 Data Flow for user registration or user authorization at another device

Fig. 2 Data Flow for user authorization at partner web service

AUTHENTICATION AND PERSONAL DATA SHARING FOR PARTNER SERVICES USING OUT-OF-BAND OPTICAL MARK RECOGNITION

RELATED APPLICATION(S)

This application is a continuation of co-pending U.S. patent application Ser. No. 17/314,900, filed May 7, 2021, and entitled "AUTHENTICATION AND PERSONAL DATA SHARING FOR PARTNER SERVICES USING OUT-OF-BAND OPTICAL MARK RECOGNITION" which is a continuation application of U.S. patent application Ser. No. 15/721,899, filed Sep. 30, 2017, and titled "AUTHENTICATION AND PERSONAL DATA SHARING FOR PARTNER SERVICES USING OUT-OF-BAND OPTICAL MARK RECOGNITION" which claims benefit of U.S. Provisional Patent Application No. 62/402,728, filed Sep. 30, 2016, which are all hereby incorporated by reference in their entirety for all purposes.

BACKGROUND OF THE DISCLOSURE

Authentication is an important aspect of on-line communication between various parties, such as service providers and individual users. In order to use a web service offered by a service provider, a user may need to confirm his identity to the service provider. The service provider may implement an authentication service locally or use an external identity provider to confirm the user's identity. When using an external identity provider, the service provider may request the identity confirmation via a standard API and may receive a verified user identity as a response. When using the web service, the user may share personal data with the service provider.

A common way for implementing authentication for both local implementations and external identify provider services is based on the use of a username and a password as authentication credentials. Password-based authentication, however, can be problematic. Usernames or passwords can be forgotten, stolen, or unintentionally exposed.

SUMMARY OF THE DISCLOSURE

This disclosure provides methods and apparatuses for creating a verified mutually authenticated transaction between a service provider and an on-line identity for a physical client person. A dynamic optical mark may be displayed on a device screen where the physical client person is using a web service. The dynamic optical mark may be recognized via scanning the dynamic optical mark by a personal mobile device equipped with a camera.

The verified mutually authenticated transaction between the service provider and the on-line identity for the physical client person may be used for sharing personal data of the physical client person by using out-of-band optical mark recognition of the dynamic optical mark. The verified mutually authenticated transaction may be initiated with a time-limited one-time password comprising a sequence of numbers encoded in the dynamic optical mark.

The on-line identity for the physical client person may be authenticated to the web service by signing a transaction completion request with a private key and a corresponding public key stored within the web service may be used for verification. The on-line identity may be verified by personal biometry. The private key may be stored at a hardware encrypted storage (TPM) of the personal mobile device.

An authorization assertion may be constructed and passed to the service provider. The authorization assertion may be in a form of a OAuth2 token, SAML token, RP token or another provider supported technology.

DETAILED DESCRIPTION

In the following description of examples, reference is made to the accompanying drawings which form a part hereof, and in which it is shown by way of illustration specific examples that can be practiced. It is to be understood that other examples are can be used and structural changes can be made without departing from the scope of the disclosed examples.

According to one aspect, a cloud-based service, or cloud service, is described which implements means to create a verified mutually authenticated transaction between a service provider and an on-line identity securely tied to a physical person with a custom mandatory security step integrated. In one example, the custom step involves displaying of a specially formed dynamic optical mark on the device where client is using web service (e.g., authorized email), and recognition of this mark via scanning it by client personal smartphone.

The client personal smartphone may hold a personal client certificate created during enrollment procedure. The personal smartphone may manage client authorization, provide full control of the stored personal data, manage the access to personal data from third-parties. Client can revoke the third-party access at any time. On the other hand, the communication between client personal smartphone and the cloud service (implemented via, e.g., an API layer and a database) may be encrypted by personal client certificate and can be performed by public networks without security flaw too.

Instead of directly providing authorization credentials, a client may use his/her personal smartphone as identity provider after mark recognition. User may specify the part of the personal data that he/she wants to share with the third-party. No sensitive data (including client credentials, client profile list, etc.) other than explicitly allowed by user for this third-party may be transferred through the computer and network used for accessing of third-party service. No direct communication may be performed between the computer and client smartphone apart from optical mark recognition. Sensitive data management may be leveraged to the client smartphone.

Client may have a number of personal data sets (profiles) stored in the single account. When a personal data is requested by the third-party, the client may have the ability to choose the profile to be shared.

Additional security level can be enabled at the smartphone by using available built-in capabilities such as device-wide password protected lock, retina scanning, fingerprint scanning. Moreover, additional security level can be enabled for different profiles separately.

In one example, the solution uniquely features ability to initiate each transaction with a sequence of numbers encoded in a proprietary dynamic optical code (see, e.g., U.S. Ser. No. 62/248,605, entitled "Palette-Based Optical Recognition Code Generators and Decoders," the entire content of which is incorporated by reference herein). These numbers may represent the time-limited one-time password (TOTP) represented in a form of a series of static optical marks. Only third-parties who are authenticated to the service can initiate transactions. Dynamic nature of the optical code may provide sufficient encoding depth and channel robustness for the high level of password security.

To complete the transaction, the code may be read through a mobile phone camera. The optical nature of the code recognition may create an out-of-band transaction verification channel air-gapped from the network over which the digital service is provided.

Client's on-line identity may authenticate to the service by signing its transaction completion request with its private key stored in the phone's hardware encrypted storage (TPM). Corresponding public key needed for verification may be stored within the service.

Once the client is authenticated, authorization assertion, which could take a form of a OAuth2 token, SAML token, RP token or another provider supported technology, may be passed to the third-party, creating a closed-loop process.

In case the mobile phone is compromised, a new set of private/public key pair may be issued. A key pair may correspond to the mobile device, or can be created individually for each of the on-line identities (profiles) registered for the physical person.

Transactions that require lower level of security can implement the protocol partially. Transactions that require multiple independent providers can also be supported.

The cloud service can be implemented via, e.g., API layer(s) and database(s) that are run on server(s), such as Linux server(s). The client personal smartphone or mobile phone may be examples of a personal mobile device. The functionalities of each computing device mentioned in this disclosure (e.g., server, personal mobile device, computer) can be performed by suitable logic circuitry in or for that computing device. For example, suitable logic circuitry may include processor(s) that, when executing instruction implemented in software program(s) stored in processor-readable storage medium(s) (e.g., memory) in or for that computing device, performs that computing device's functionalities. As another example, suitable logic circuitry may include hardware logic circuitry, such as a programmable logic device or an application-specific integrated circuit, implementing logic designs that provide that computing device's functionalities. As yet another example, suitable logic circuitry for that computing device may include an implementation that combines both processor(s) running software and hardware logic circuitry.

The following workflows describe exemplary processes of partner registration, user registration, user authorization on the example of OAuth2 protocol used for data sharing.

Third-Party Partner Registration

To get personal information about particular client, third-party partner may need to be registered providing administrator email, service name, service base URL, URL for OAuth2 redirect required access level and arbitrary secret key. These registration data may be stored in the database 160.

Third-party administrator may provide additional information on how to verify the owner of the domain and payment information.

Figure 1:
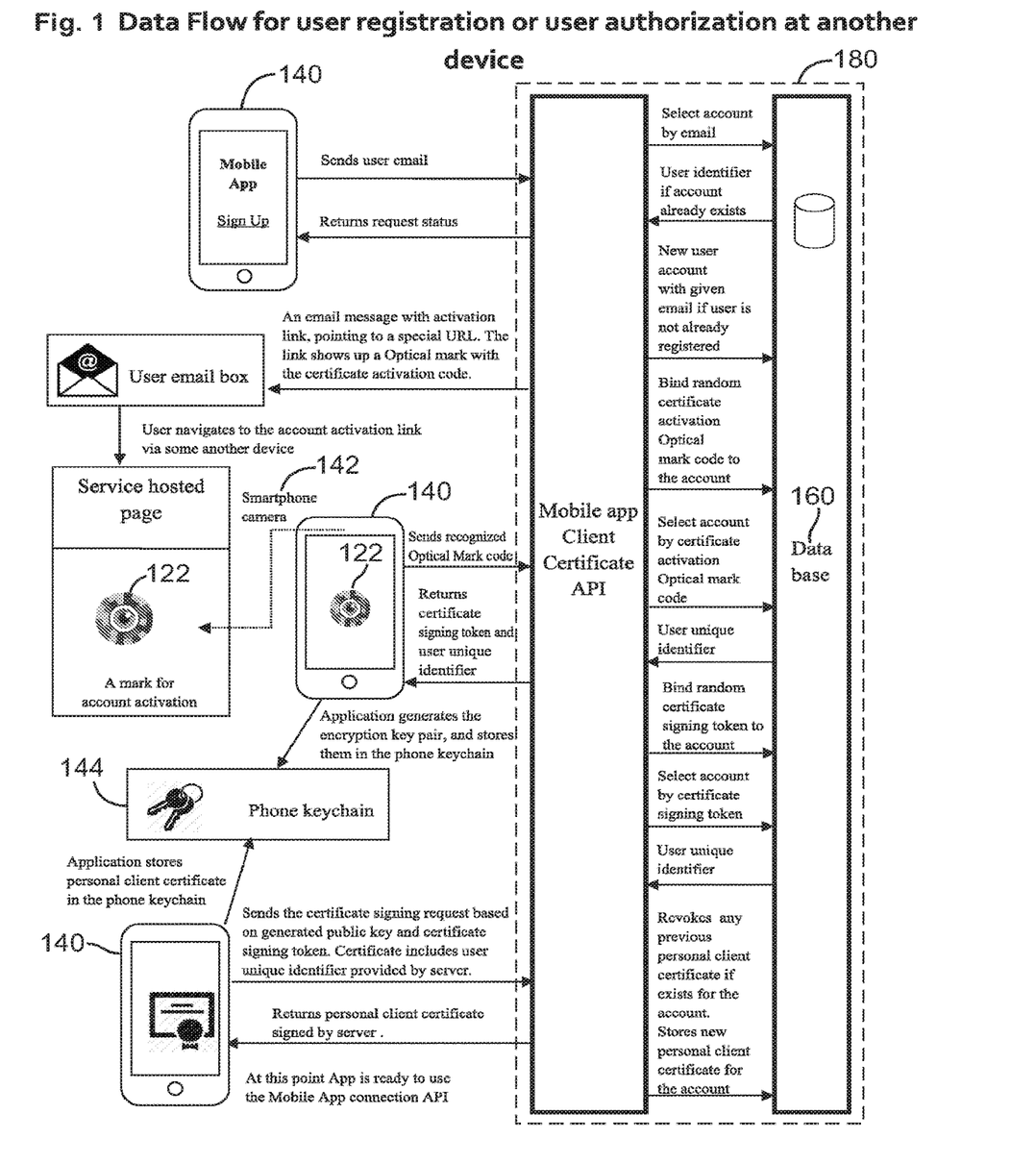
FIG. 1 illustrates exemplary processes for user registration or user authorization.

FIG. 1 illustrates an exemplary process for user registration at mobile application.

Workflow for User Registration at Mobile Application

User may install the application 120 at his smartphone 140 and start it.

A Sign Up view of application 120 may be displayed.

User may navigate to the Sign Up screen and follow the sign up procedure providing his email.

Application 120 may send the given email to the cloud service 180 over TLS connection using temporary asymmetric RSA key pair for this communication. TLS connection can also be known as SSL connection.

An account record may be created for the user, having stored user email. An activation link may be sent to user email.

A message may be shown to the user informing him that the enrollment procedure is pending and he should check email. A scanner view of the application 120 may be displayed with all UI controls related to user profile disabled.

User may navigate to the activation link on another computer. A special dynamic optical mark 122 for enrollment procedure may be displayed. Optical mark 122 may encode registration session identifier. In some embodiments, the optical mark 122 includes at least two concentric circles, wherein a portion of the optical mark within the at least two concentric circles, comprises a plurality of segments each comprising one color of a plurality of different colors.

User may scan the given optical mark 122 by pointing smartphone camera 142 to the optical mark 122 having application 120 in the foreground.

Application 120 may send the scanned code to the cloud service 180 over TLS (or SSL) connection using temporary asymmetric RSA key pair for this communication.

If recognized code matches to stored registration session identifier then cloud service 180 may return the unique user identifier and certificate signing token to the application 120.

Application 120 may generate a new personal asymmetric RSA key pair and store the private key at the smartphone 140 in protected storage space 144.

X.509 certificate signing request may be created using the personal key pair and given user identifier.

Application 120 may send the X.509 certificate signing request and certificate signing token to the cloud service 180 over TLS (or SSL) connection using temporary asymmetric RSA key pair for this communication.

Cloud service 180 may match user identifier with X.509 certificate signing request and certificate signing token, sign the X.509 certificate and return signed personal X.509 certificate to the application 120.

Application 120 may store the personal X.509 certificate at the smartphone 140 in protected storage space 144 and enable UI controls related to user profile.

User may create and fill in at least one profile in the application 120.

Application 120 may send profile data to the cloud service 180 over TLS (or SSL) connection using personal X.509 certificate.

Cloud service 180 may identify user by personal X.509 certificate and store the profile information.

Application 120 may be ready to scan optical marks to perform user authorization at third-parties.

Workflow for User Certification Invalidation

Personal user certificate invalidation may be performed at the following circumstances.
  a. Administrator manually revokes the certificate for particular user via Administrative Tool.
  b. User installs the application 120 to another device and activates a new personal certificate, the previous one becomes revoked.
  c. Personal user certificate is expired.

When mobile application 120 tries to perform any request over TLS (or SSL) connection using revoked/expired personal X.509 certificate, the cloud service 180 may return special error code denoting the using certificate is invalid and should be deleted.

Application 120 may check if the server certificate matches the one stored at the application 120, removes certificate and RSA key pair from the keychain and show Sign Up view.

User may have to follow the "Workflow for user authorization at the application using another device (or in the case of personal X.509 certificate revocation/expiration)" below.

FIG. 1 also illustrates an exemplary process for user authorization at the application using another device (or in the case of personal X.509 certificate revocation/expiration) Workflow for User Authorization at the Application Using Another Device (or in the Case of Personal X.509 Certificate Revocation/Expiration)

User may install the application 120 at a new smartphone 140 and start it, or User may start the application 120 having invalid (e.g., revoked or expired) personal X.509 certificate.

A Sign Up view of the application 120 may be displayed.

User may navigate to the Sign Up screen and may follow the sign up procedure providing his email.

Application 120 may send the given email to the cloud service 180 over TLS (or SSL) connection using temporary asymmetric RSA key pair for this communication.

Cloud service 180 may find user account by given email. An activation link may be sent to user email.

A message may be shown to the user informing him that the enrollment procedure is pending and he should check email. A scanner view of the application 120 may be displayed with all UI controls related to user profile disabled.

User may navigate to the activation link on another computer. A special dynamic optical mark 122 for enrollment procedure may be displayed.

User may scan the given optical mark 122 by pointing smartphone camera 142 to the optical mark 122 having application 120 in the foreground.

Application 120 may send the scanned code to the cloud service 180 over TLS (or SSL) connection using temporary asymmetric RSA key pair for this communication.

Cloud service 180 may return the unique user identifier and certificate signing token to the application 120.

Application 120 may generate a new personal asymmetric RSA key pair and store the private key at the smartphone 140 in protected storage space 144.

X.509 certificate signing request may be created using the personal key pair and given user identifier.

Application 120 may send the X.509 certificate signing request and certificate signing token to the cloud service 180 over TLS (or SSL) connection using temporary asymmetric RSA key pair for this communication.

Cloud service 180 may match user identifier with X.509 certificate signing request and certificate signing token, sign the X.509 certificate and return signed personal X.509 certificate to the application 120.

Application 120 may store the personal X.509 certificate at the smartphone 140 in protected storage space 144 and enable UI controls related to user profile.

User may create and fill in at least one profile in the application 120.

Application 120 sends profile data to the cloud service 180 over TLS (or SSL) connection using personal X.509 certificate.

Cloud service 180 may identify user by personal X.509 certificate and store the profile information.

Application 120 may be ready to scan optical marks to perform user authorization at third-parties.

Figure 2:
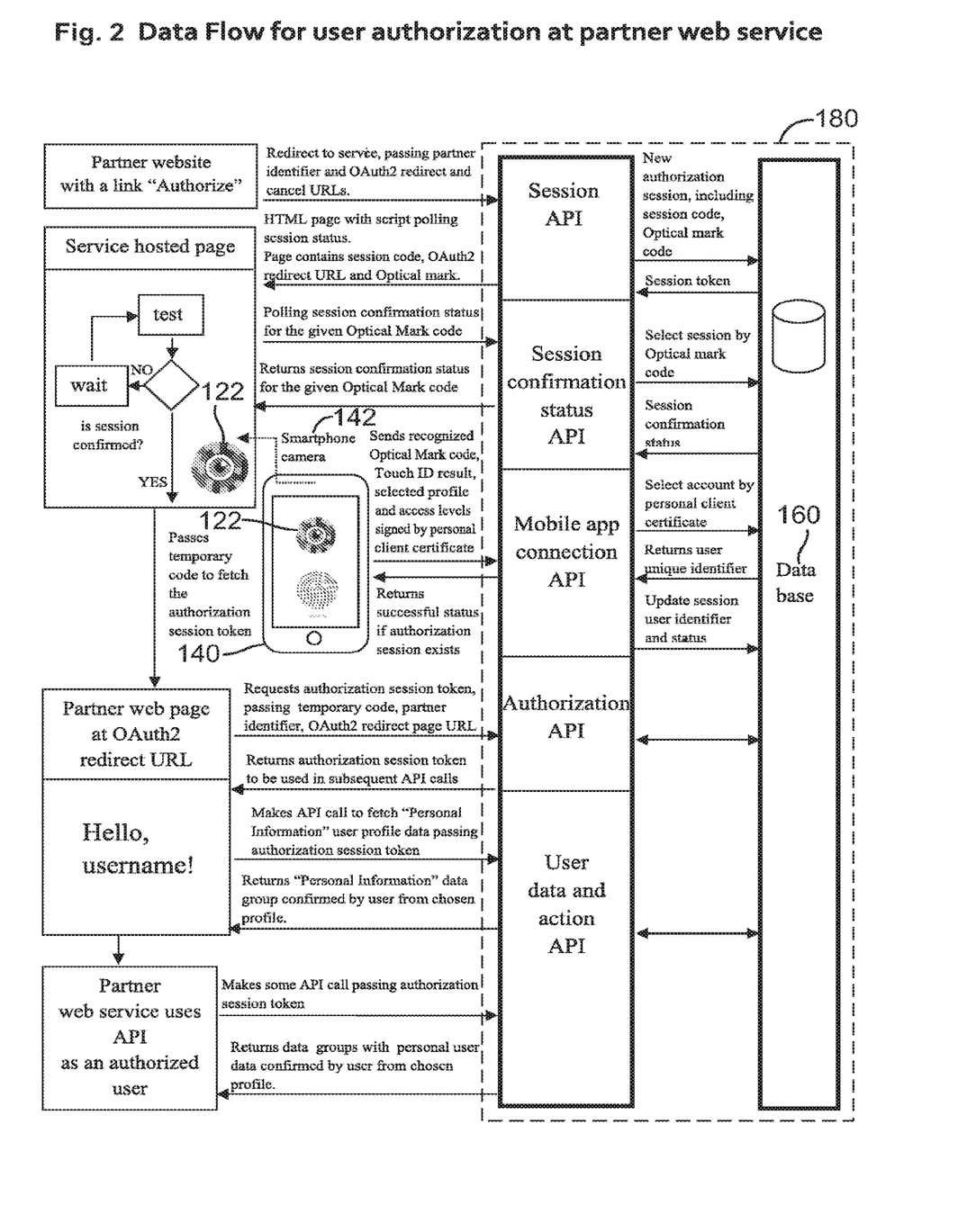
FIG. 2 illustrates an exemplary process for user authorization at a partner web service.

FIG. 2 illustrates an exemplary process for user authorization at a partner web service.

Workflow for User Authorization at a Partner Web Service

User may click at the special link at the partner web service.

Third-party may redirect user browser to a special web page for custom authorization.

A new authorization session may be created in the cloud service 180. A random session code, random dynamic optical mark code, access token, and one-time OAuth2 code may be generated and stored in the authorization session record.

The custom authorization page may display special dynamic optical mark 122 to user and display information on which data will be available to the partner. A polling may be performed to check if mark 122 is already recognized.

User may start the application 120 and direct smartphone camera 142 to the dynamic optical mark 122 displayed at the page.

Application 120 may recognize the dynamic optical mark 122 and send its code over TLS (or SSL) connection using personal X.509 certificate.

Cloud service 180 may identify source user by personal X.509 certificate and associate user identifier with the authorization session.

If user has already authorized with this partner:
Cloud service 180 may use the selected profile and access levels from the previous authorization session at this partner.

If user has not already authorized with this partner:
Cloud service 180 may return "profile" state to the application 120.

Application 120 may display the profile choosing view with profile list and the access level controls.

User may select the profile he wants to be used by this partner. Before actual authorization, the user may, if he deems it fit, adjust the access levels.

Application 120 may send the selected profile identifier, access levels over TLS (or SSL) connection using personal X.509 certificate.

Cloud service 180 may identify source user by personal X.509 certificate and binds the profile selection and access levels to the authorization session.

If the selected profile and access levels require multifactor procedure:
Cloud service 180 may return "multifactor" state to the application 120.

Application 120 may display security screen with additional verification procedure implemented (for example, fingerprint scan).

User may go through the additional verification procedure.

Application 120 may send the additional verification result over TLS (or SSL) connection using personal X.509 certificate.

Cloud service 180 may identify source user by personal X.509 certificate and the authorization session and allow the process to continue.

Cloud service 180 may return "finish" state to the application 120.

Application 120 may return to the main scanner view.

Custom authorization page may redirect user browser back to the partner web service (HTTPS back redirect URL is mandatory) with the one-time OAuth2 code in the GET parameter.

Partner web service may make a request to cloud service 180 via TLS (or SSL) connection providing partner web service identifier, given one-time OAuth2 code and secret partner key.

Cloud service 180 may search the given one-time OAuth2 code and returns the stored authorization session access token to the partner if match and the state of the authorization session is active.

Partner web service may now have an access token which may enable it to make requests to the cloud service 180.

Partner web service may make a request to cloud service 180 using given access token to fetch user unique identifier, first and last name and any other required private information. Cloud service 180 may return requested data if the state of the authorization session is active.

User may see his name at the partner website and can act as an authorized user.

Partner website may contain a link that makes user to logout. This link may pass the session code for the authorization session to be invalidated in the cloud service 180. Alternatively, user can break the authorization session at the partner web service at any time using "Remove Application" feature in the mobile application 120.

It should be noted that the practice of the present disclosure is not limited to the above-described examples. Those of ordinary skill in the art may perform modification or variation in accordance with the foregoing description, and all such modifications and variations should fall into the scope of the appended claims of the present disclosure.

What is claimed is:

1. A device comprising:
   a processor;
   a non-transitory memory coupled to the processor and storing an application, the application when executed by the processor causes the processor to perform the following:
      generating an optical mark, including at least two concentric circles, wherein a portion of the optical mark within the at least two concentric circles, comprises a plurality of segments each comprising one color of a plurality of different colors;
      displaying the optical mark on a device screen of the device;
      receiving an authentication from a mobile device, wherein the authentication is based on the mobile device scanning the optical mark; and
      displaying on the device screen a visual indication of the authorization of a client to access the web service of the web service provider.

2. The device of claim 1 wherein the optical mark comprises a one-time password.

3. The device of claim 1 wherein the application is further configured for:
   orienting the optical mark upon detection, by positioning a registration mark relative to the portion of the optical mark; and
   encoding the portion based on the plurality of different colors including associating each color with an optical code comprising a number.

4. The device of claim 1 wherein the application is further configured for: calibrating the optical mark by comparing the plurality of different colors within a calibration region within the at least two concentric circles to an encoding palette.

5. The device of claim 1 wherein the optical mark is recognized when it is displayed on a device screen of a mobile device.

6. The device of claim 5 wherein recognizing the optical mark comprises recognizing the optical mark over an air-gapped channel between the mobile device and the device screen of the device.

* * * * *